March 22, 1949.    F. C. RUSHING ET AL    2,465,275
MOTOR CONSTRUCTION
Filed June 8, 1946
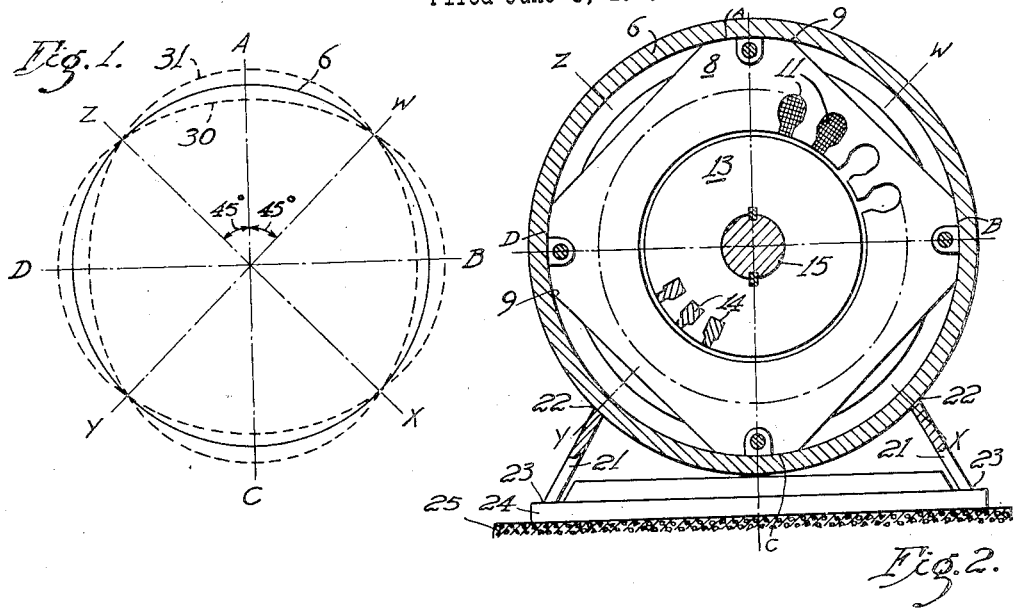
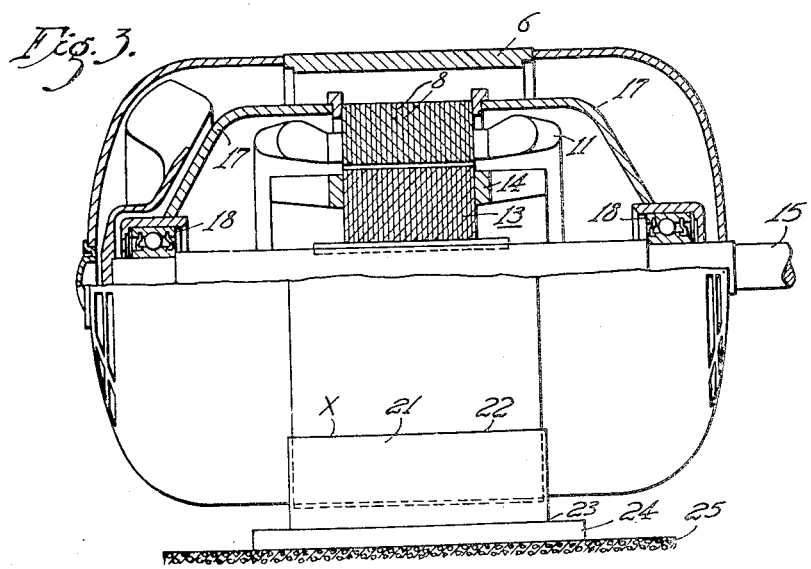
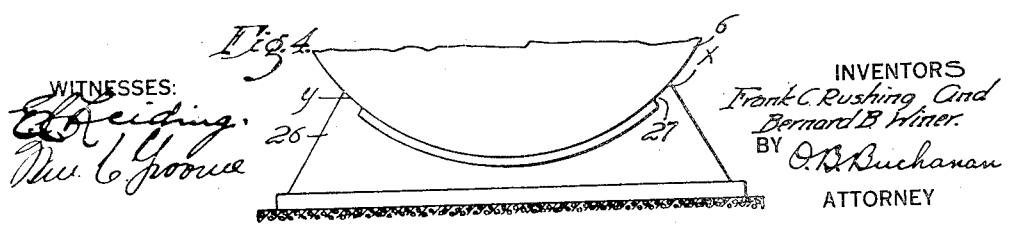
INVENTORS
Frank C. Rushing and
Bernard B. Winer
BY O. B. Buchanan
ATTORNEY Patented Mar. 22, 1949

2,465,275

UNITED STATES PATENT OFFICE 2,465,275

MOTOR CONSTRUCTION

Frank C. Rushing and Bernard B. Winer, Pittsburgh, Pa., assignors to Westinghouse Electric Corporation, East Pittsburgh, Pa., a corporation of Pennsylvania Application June 8, 1946, Serial No. 675,410

16 Claims. (Cl. 172—36)

1

Our invention relates to a motor-construction, and it has particular relation to supporting-means for suppressing vibration in an electric motor, and while our invention is of more or less general utility in dynamo-electric machines, it is especially adapted for 2-pole squirrel-cage 60-cycle motors.

The principal object of our invention is to provide improved means for reducing transmission of magnetically induced motor-stator vibration to the motor-feet, and thence to the foundation.

A further object of our invention is to reduce the amount of motor-stator vibration which is caused by impacts in the bearings, as for example, impacts in imperfect antifriction bearings.

These and other objects will be better understood from the theoretical explanations hereinafter given, and from the two illustrative forms of embodiment of our invention which are shown in the accompanying drawing, wherein Figure 1 is a diagrammatic view showing the stator-frame as a circle, and showing the elliptical distortions greatly exaggerated for the purpose of illustration;

Fig. 2 is a transverse sectional view of a motor embodying our invention in a structure utilizing flexible foot-plates;

Fig. 3 is a side view of the motor shown in Fig. 2, with the top half of Fig. 3 in longitudinal section on the line YW, and Fig. 4 is a diagrammatic end-view illustrating a different form of embodiment of the invention.

Referring first to the form of embodiment of our invention shown in Figs. 2 and 3, it will be noted that our invention is shown as being applied to the principal type of motor or dynamo-electric machine to which the invention is most applicable, namely a horizontal-shaft motor having a stator member which comprises a cylindrical stator-frame or ring 6, and a stator-core comprising a stack of approximately square-shaped, or other four-point-mounted, stator-laminations 8 having rounded corners 9 which are pressed or otherwise tightly engaged within the stator-frame 6 at places A, B, C, D which are disposed approximately in the vertical diameter AC and the horizontal diameter BD, respectively. By "four-point-mounted," we mean to refer to stator-laminations which engage the stator-frame 6 at only four limited-area points A, B, C and D.

The stator-core 8 carries a stator-winding 11 which is preferably a wound two-pole winding, because our invention is particularly applicable to two-pole motors, as will subsequently be explained. It will usually be desirable, for the sake of uniformity, if for no other reason, to apply our invention to an entire line of motors, including motors having pole-numbers greater than two.

The motor has a rotor member which comprises a rotor-core 13, and the particular rotor which is shown in Fig. 2 is provided with a squirrel-cage rotor-winding 14. The rotor-core 13 is supported by a shaft 15. As shown in Fig. 3, the motor is provided with two end-brackets 17 which are carried by the stator-core 8 or by any other portion of the stator member. Each end-bracket 17 has a bearing 18 which supports that end of the shaft 15. These bearings are illustrated as antifriction bearings, although they might also be ordinary journal bearings.

Our invention is more particularly concerned with a novel construction of the foot-mounting or bracket which supports the motor, or a novel relation between said foot-mounting and the contact-places A, B, C and D between the stator-core 8 and the stator-frame or ring 6. In accordance with our invention, the foot-bracket makes contact, with the stator-frame 6, only at places X and Y which are disposed approximately 45° with respect to the vertical diameter AC and the horizontal diameter BD.

In the particular form of foot-construction which is shown in Figs. 2 and 3, we provide two longitudinally extending foot-plates 21, lying in planes which are preferably approximately radial, or inclined at only small angles with respect to a radial direction. The inner edges of the foot-plates 21, as shown at 22, are joined laterally to the outer periphery of the stator-frame 6. The outer edges 23 of the foot-plates 21 are rigidly connected by means of a flat foot-piece or base 24 which is adapted to be mounted on a floor or other foundation or mounting-plane 25.

In the form of our invention which is shown in Fig. 4 the foot-construction comprises a plurality of transversely extending foot-plates 26, which are disposed in planes which are transverse with respect to the axis of the motor, so that these transverse foot-plates have a considerable stiffness in a transverse plane, normal to the axis of the motor. Each of these transverse foot-plates is provided, in effect, at each end, with a short protuberance 27, which is secured laterally to the stator-frame 6 at one or the other of said contact-places X or Y, as the case may be.

In operation, our invention is particularly designed to suppress vibrations which are due to radial forces operating on the stator-frame 6 or on the stator core-and-frame combination 8—6. The radial force just referred to may be the result of the magnetic attraction between the stator member and the rotor member, due to the magnetic flux of the motor, or said radial force may be caused by impacts resulting from imperfections in the antifriction bearings 18 or other bearings with which the motor is provided. In the case of stator-frame vibration or distortions due to the flux, or force of magnetic attraction, the frequency of this vibration or distortion will be twice the line-frequency, or 120 cycles per second in a 60-cycle motor. In the case of stator-frame vibration or distortions due to bearing-impacts, the frequency of the vibrations will more usually be the natural frequency of vibration of the stator-frame assembly, which will usually be higher than twice the line-frequency, so as to avoid resonance-difficulties in connection with the magnetically induced vibration.

The nature of the frame-vibration due to the flux is indicated diagrammatically in Fig. 1, wherein the frame-ring is indicated by a single circle 6. In a two-pole motor, when the centers of the magnetic poles are in the vertical diameter AC, the stator-frame 6 will be drawn radially inwardly along this diameter, causing the frame to bulge radially outwardly at the horizontal diameter BD, thus distorting the stator-frame 6 into an elliptical formation 30. The amount of this distortion is of the order of one ten thousandths of an inch, more or less, and it is grossly exaggerated in Fig. 1 in order to be able to illustrate it at all. When the centers of the magnetic-poles are in the horizontal diameter BD, the stator-frame 6 is pulled inwardly at this horizontal diameter, and bulged outwardly at the vertical diameter AC, in an elliptical formation 31. As the motor rotates, the magnetic poles rotate, causing the bulges and depressions at each of the points A, B, C and D to wax and wane, changing from one ellipse 30 to the other ellipse 31, throughout the operation of the motor.

At each of the node-points X, Y, Z, W, halfway between the points, B, C, D and A, it will be seen, from Fig. 1, that there is a vibratory movement which is counterclockwise at Y and W whenever it is clockwise at X and Z, and vice versa.

It is important to note that the radial pulsation of the stator-frame 6, at the elliptical axes AC and BD, cannot produce radially directed forces or motions at the node-points X, Y, Z, and W. Our invention is predicated on this circumstance.

In a common known form of motor which has heretofore been utilized, embodying the approximately square-shaped stator-laminations 8 which make contact with the stator-frame 6 at four points A, B, C and D, the contact-points A, B, C and D have been inclined in the diagonal diameters which we have shown at XZ and YW, and the motor-supports have been attached to the stator-frame at two of these four contact-places A, B, C and D of the stator-core. In another known form of construction, the motor-supports have been brought into contact with a rather extended area of the stator-frame, extending around through a considerable arc around its outer circumference. As a result, the radial vibration or distortions of the stator-frame have been transmitted through the supporting-feet to the foundation on which the motor was mounted.

In accordance with our invention, the forces which are transmitted to the foundation are greatly reduced, by utilizing the relative locations of the stator-core contact-points A, B, C and D, and the 45° displaced locations of the foot-contact points X and Y. A two-pole rotating field can cause the frame-ring 6 to move in and out, at the contact-points A, B, C and D where the stator-core 8 makes contact with the motor-frame 6. At each of the points X and Y where the feet are attached, the frame-ring 6 has a slight angular vibration, but no radial motion, and hence the radial motion of the frame-ring 6, which occurs at the points A, B, C, and D, is not transmitted through the feet to the foundation.

In the form of invention shown in Figs. 2 and 3, the angular vibrations at the foot-attachments X and Y give the respective foot-plates 21 a small angular motion, tending to very slightly bend the plates 21, so that these two plates alternately bow outwardly and inwardly, in unison, as viewed looking endwise of the motor, as in Fig. 2. It will also be noted that this angular motion or bending of the plates is in the plane in which the plates have their greatest flexibility, so that only small moments or forces reach the horizontal foot-piece or base 24. Furthermore, the bending-forces which are transmitted by the plates 21 to the foot-piece 24 act in opposite directions on the foot-piece 24, so that these bending forces counteract each other, except that a very slight bending-force is transmitted by the relatively flexible plates 21 to the relatively rigid foot-piece 24. The foot-piece 24 can be rigid enough to give a desired minimum bowing-motion due to these transmitted bending forces. The foundation 25 will aid in the stiffening effect.

In the form of our invention shown in Fig. 4, the foot-assembly is very stiff in a transverse plane, and very stiff in its resistance to any angular distortions at the contact-points X and Y where the foot-structure is attached to the motor-frame 6. The foot-plates 26 of Fig. 4 are so stiff that they distort by only a negligible amount, as a result of translatory radial motion at A, B, C or D. An intermediate amount of foot-stiffness would also suffice, the essential feature being that the foot does not transmit the resultant force and moments to the foundation, except in such minute amounts as to be negligible.

For the stator-orientation to function best in our invention, it is necessary that the arcs of contacts between the stator-core 8 and the frame 6, at the contact-places A, B, C and D, shall be as small as feasible. A line-contact would be theoretically ideal, but in practice is not an absolute necessity. If the contact is very wide, the angular motion which occurs in the stator-core, when the node-points of its elliptical distortion occur at these points A, B, C and D, will produce angular motion in the frame-ring 6 at these points A, B, C and D, and will accordingly produce radial motions in the frame at the foot-attachment points X and Y, which is just the thing which is to be avoided. Our invention is predicated upon the proposition that the frame-ring 6 can be distorted only radially, at these core-contact points A, B, C and D. In order that the frame-ring 6 may not be distorted angularly at these core-points A, B, C and D, it is necessary for the contact-points at A, B, C and D to be relatively small.

In any annular or ring-shaped or cylindrical structure, such as is represented by the circle 6 in the single-line diagrammatic representation of Fig. 1, if the ring has a radial thickness or depth, as it must have, in any actual structure, there is a certain neutral axis in which the only motion of the particles is a true rectilinear motion in a radial direction. At all other points, in an annular structure which is subjected to elliptical distortions, as shown in Fig. 1, each particle will have an elliptical path of motion, rather than a rectilinear radial motion, so that there will be a tangential component of the vibratory motion.

Ideally, it is desirable to have our contact-points, A, B, C and D, between the outer periphery of the laminations 8 and the inner periphery of the core-ring 6, approximately at such radius that said contact-points lie in the neutral axis of the stator core-and-frame combination, where the stator-motion due to radial force is approximately purely radial, without any tangential component of motion. If our contact-points A, B, C and D were at some radius other than the radius of the neutral axis, the frame would be subjected to tangential, as well as to radial distortion at each of these points, but the tangential distortions would tend to cancel each other, and the net effect on the foundation would be small in any event. In actual practice, we have found that, with the thickness of the frame-ring 6 which we desire for the purpose of providing a reasonable strength and rigidity, and with the radial-core depth which is desirable from the standpoint of flux-carrying characteristics, the ideal neutral frame-axis is approximately at the inner bore of the frame-ring 6, practically at the radius where our contact-places are located at A, B, C and D.

Ideally, it is advantageous, in a construction utilizing flexible foot-plates 21 as shown in Fig. 2, to have said plates lie more or less accurately in radial planes, or in such planes that their line of intersection coincides with a principal inertia-axis of the motor. The advantage of this construction is that tangential motions of the frame are substantially isolated by such a mounting, and prevented from being transmitted to the foundation; and at the same time, the mounting offers substantially a maximum resistance to radial displacement of the frame as a whole.

When the radial frame-distorting force results from impacts occurring in the anti-friction bearings 18, the stator frame-ring 6 has very little radial vibration or motion at the core-contact points A, B, C and D, because the core and frame-assembly is relatively thick radially, at these points, and hence very stiff. The vibration which the stator frame-ring 6 is the most likely to have, under such shock-excitation, will be an elliptical vibration having its nodal points at A, B, C and D, and points of maximum radial motion at W, X, Y and Z. In those machines, therefore, having this bearing-induced form of motion or vibration of the frame, our supporting-feet, by reason of their attachment to the frame at the points X and Y, stiffen the frame, thereby increasing the natural frequency, and reducing the amplitude, of these bearing-induced vibrations.

In the form of our invention which is shown in Fig. 4, it will be noted that the transversely disposed foot-plates 26 give the stator-frame 6 some additional rigidity, opposing forces, such as belt-loads, pulling on the shaft.

While we have shown our invention in only two preferred forms of embodiment, it will be understood that this illustration is only intended by way of example, and that many changes may be made without essentially departing therefrom. We desire, therefore, that the appended claims shall be accorded the broadest construction consistent with their language.

We claim as our invention:

1. A dynamo-electric machine characterized by having a cylindrical stator-frame, a foot-construction which makes contact laterally, with the stator-frame, only at places which are displaced approximately 45° with respect to the mounting-plane of the foot-construction, and a stator-core comprising a stack of four-point-mounted stator-laminations tightly engaging within the stator-frame at places which are disposed approximately in the diameters perpendicular to and parallel with the mounting-plane of the foot-construction.

2. A dynamo-electric machine having a stator member comprising a cylindrical stator-frame, a foot-construction which makes contact laterally, with the stator-frame, only at places which are displaced approximately 45° with respect to the mounting-plane of the foot-construction, a stator-core comprising a stack of four-point-mounted stator-laminations tightly engaging within the stator-frame at places which are disposed approximately in the diameters perpendicular to and parallel with the mounting-plane of the foot-construction, a rotor-member comprising a rotor-core disposed within the stator-core, a shaft carrying said rotor-core, two end-brackets carried by the stator member, and shaft-supporting bearing carried by said end-brackets.

3. A two-pole dynamo-electric machine characterized by having a cylindrical stator-frame, a foot-construction which makes contact laterally, with the stator-frame, only at places which are displaced approximately 45° with respect to the mounting-plane of the foot-construction, a stator-core comprising a stack of four-point-mounted stator-laminations tightly engaging within the stator-frame at places which are disposed approximately in the diameters perpendicular to and parallel with the mounting-plane of the foot-construction, and a two-pole stator-winding carried by said stator-core.

4. A two-pole dynamo-electric machine having a stator member comprising a cylindrical stator-frame, a foot-construction which makes contact laterally with the stator-frame, only at places which are displaced approximately 45° with respect to the mounting-plane of the foot-construction, a stator-core comprising a stack of four-point-mounted stator-laminations tightly engaging within the stator-frame at places which are disposed approximately in the diameters perpendicular to and parallel with the mounting-plane of the foot-construction, a rotor-member comprising a rotor-core disposed within the stator-core, a shaft carrying said rotor-core, a rotor-winding carried by said rotor-core, either said stator-winding or said rotor-winding being a wound two-pole winding, two end-brackets carried by the stator member, and shaft-supporting bearings carried by said end-brackets.

5. The invention as defined in claim 1, characterized by the points of contact between the stator-core and the stator-frame being approximately in the neutral axis of the stator core-and-frame combination, where the stator-motion due to radial forces is approximately purely radial.

6. The invention as defined in claim 1, characterized by the foot-construction comprising two longitudinally extending foot-plates lying in planes which are approximately radial, the inner edges of said foot-plates being joined to the stator-frame, and a foot-piece substantially rigidly joining the outer edges of said foot-plates.

7. The invention as defined in claim 1, characterized by the foot-construction comprising a plurality of transversely extending plates having a considerable stiffness in a transverse plane.

8. The invention as defined in claim 2, characterized by the points of a contact between the stator-core and the stator-frame being approximately in the neutral axis of the stator core-and-frame combination, where the stator-motion due to radial forces is approximately purely radial.

9. The invention as defined in claim 2, characterized by the foot-construction comprising two longitudinally extending foot-plates lying in planes which are approximately radial, the inner edges of said foot-plates being joined to the stator-frame, and a foot-piece substantially rigidly joining the outer edges of said foot-plates.

10. The invention as defined in claim 2, characterized by the foot-construction comprising a plurality of transversely extending plates having a considerable stiffness in a transverse plane.

11. The invention as defined in claim 3, characterized by the points of contact between the stator-core and the stator-frame being approximately in the neutral axis of the stator core-and-frame combination, where the stator-motion due to radial forces is approximately pure radial.

12. The invention as defined in claim 3, characterized by the foot-construction comprising two longitudinally extending foot-plates lying in planes which are approximately radial, the inner edges of said foot-plates being joined to the stator-frame, and a foot-piece substantially rigidly joining the outer edges of said foot-plates.

13. The invention as defined in claim 3, characterized by the foot-construction comprising a plurality of transversely extending plates having a considerable stiffness in a transverse plane.

14. The invention as defined in claim 4, characterized by the points of contact between the stator-core and the stator-frame being approximately in the neutral axis of the stator core-and-frame combination, where the stator-motion due to radial forces is approximately purely radial.

15. The invention as defined in claim 4, characterized by the foot-construction comprising two longitudinally extending foot-plates lying in planes which are approximately radial, the inner edges of said foot-plates being joined to the stator-frame, and a foot-piece substantially rigidly joining the outer edges of said foot-plates.

16. The invention as defined in claim 4, characterized by the foot-construction comprising a plurality of transversely extending plates having a considerable stiffness in a transverse plane.

FRANK C. RUSHING.
BERNARD B. WINER.

REFERENCES CITED

The following references are of record in the file of this patent:

UNITED STATES PATENTS

| Number | Name | Date |
|---|---|---|
| 1,446,898 | Gysel | Feb. 27, 1923 |
| 1,635,319 | Gill et al | July 12, 1927 |
| 1,642,448 | Lavigne | Sept. 3, 1927 |
| 2,001,799 | Seyfried | May 21, 1935 |
| 2,199,351 | Taylor | Apr. 30, 1940 |